(12) United States Patent
Shpunt et al.

(10) Patent No.: US 10,152,801 B2
(45) Date of Patent: *Dec. 11, 2018

(54) DEPTH MAPPING BASED ON PATTERN MATCHING AND STEREOSCOPIC INFORMATION

(71) Applicant: APPLE INC., Cupertino, CA (US)

(72) Inventors: Alexander Shpunt, Portola Valley, CA (US); Gerard Medioni, Los Angeles, CA (US); Daniel Cohen, Tel Aviv (IL); Erez Sali, Savion (IL); Ronen Deitch, Modiin (IL)

(73) Assignee: APPLE INC., Cupertino, CA (US)

(*) Notice: Subject to any disclaimer, the term of this patent is extended or adjusted under 35 U.S.C. 154(b) by 4 days.

This patent is subject to a terminal disclaimer.

(21) Appl. No.: 15/271,398

(22) Filed: Sep. 21, 2016

(65) Prior Publication Data

US 2017/0011524 A1    Jan. 12, 2017

Related U.S. Application Data

(63) Continuation of application No. 12/844,864, filed on Jul. 28, 2010.

(Continued)

(51) Int. Cl.
*G06T 7/00* (2017.01)
*G01B 11/25* (2006.01)
(Continued)

(52) U.S. Cl.
CPC .............. *G06T 7/521* (2017.01); *G01B 11/22* (2013.01); *G01B 11/25* (2013.01); *G06T 7/593* (2017.01); *H04N 5/33* (2013.01); *H04N 13/239* (2018.05); *H04N 13/25* (2018.05); *H04N 13/254* (2018.05); *H04N 13/271* (2018.05); *H04N 13/296* (2018.05); *G06T 2207/10024* (2013.01); *G06T 2207/10028* (2013.01)

(58) Field of Classification Search
None
See application file for complete search history.

(56) References Cited

U.S. PATENT DOCUMENTS

| 6,377,700 B1* | 4/2002 | Mack ..................... G01B 11/25 348/E13.005 |
| 2004/0105580 A1* | 6/2004 | Hager ..................... G06K 9/32 382/154 |

(Continued)

OTHER PUBLICATIONS

Zhu et al., "Fusion of Time-Of-Flight Depth and Stereo for High Accuracy Depth Maps", Jun. 23, 2008, IEEE Conference on Computer Vision and Pattern Recognition, 2008. CVPR 2008., pp. 1-8.*

*Primary Examiner* — Kaitlin A Retallick
(74) *Attorney, Agent, or Firm* — D. Kligler IP Services Ltd.

(57) ABSTRACT

A method for depth mapping includes projecting a pattern of optical radiation onto an object. A first image of the pattern on the object is captured using a first image sensor, and this image is processed to generate pattern-based depth data with respect to the object. A second image of the object is captured using a second image sensor, and the second image is processed together with another image to generate stereoscopic depth data with respect to the object. The pattern-based depth data is combined with the stereoscopic depth data to create a depth map of the object.

22 Claims, 6 Drawing Sheets

Related U.S. Application Data

(60) Provisional application No. 61/229,754, filed on Jul. 30, 2009.

(51) Int. Cl.

| | | |
|---|---|---|
| *G01B 11/22* | (2006.01) | |
| *H04N 5/33* | (2006.01) | |
| *G06T 7/521* | (2017.01) | |
| *H04N 13/25* | (2018.01) | |
| *H04N 13/254* | (2018.01) | |
| *H04N 13/271* | (2018.01) | |
| *H04N 13/296* | (2018.01) | |
| *G06T 7/593* | (2017.01) | |
| *H04N 13/239* | (2018.01) | |

(56) References Cited

U.S. PATENT DOCUMENTS

| | | | | |
|---|---|---|---|---|
| 2006/0210146 A1* | 9/2006 | Gu | ............ | G01B 11/25 |
| | | | | 382/154 |
| 2009/0060307 A1* | 3/2009 | Ghanem | ............ | G06T 7/0012 |
| | | | | 382/131 |
| 2009/0201384 A1* | 8/2009 | Kang | ............ | H04N 5/247 |
| | | | | 348/222.1 |
| 2010/0303289 A1* | 12/2010 | Polzin | ............ | G06K 9/00342 |
| | | | | 382/103 |
| 2010/0328475 A1* | 12/2010 | Thomas | ............ | H04N 13/0022 |
| | | | | 348/222.1 |

* cited by examiner

DEPTH MAPPING BASED ON PATTERN MATCHING AND STEREOSCOPIC INFORMATION

CROSS-REFERENCE TO RELATED APPLICATIONS

This application is a continuation of U.S. patent application Ser. No. 12/844,864, filed Jul. 28, 2010, which claims the benefit of U.S. Provisional Patent. Application 61/229,754, filed Jul. 30, 2009, which is incorporated herein by reference.

FIELD OF THE INVENTION

The present invention relates generally to computer vision, and specifically to three-dimensional (3D) mapping and imaging.

BACKGROUND OF THE INVENTION

Various methods are known in the art for optical 3D mapping, i.e., generating a 3D profile of the surface of an object by processing an optical image of the object. This sort of 3D profile is also referred to as a depth map or depth image, and 3D mapping is also referred to as depth mapping.

Some methods of 3D mapping are based on projecting a laser speckle pattern onto the object, and then analyzing an image of the pattern on the object. For example, PCT International Publication WO 2007/043036, whose disclosure is incorporated herein by reference, describes a system and method for object reconstruction in which a coherent light source and a generator of a random speckle pattern project onto the object a coherent random speckle pattern. An imaging unit detects the light response of the illuminated region and generates image data. Shifts of the pattern in the image of the object relative to a reference image of the pattern are used in real-time reconstruction of a 3D map of the object. Further methods for 3D mapping using speckle patterns are described, for example, in PCT International Publication WO 2007/105205, whose disclosure is also incorporated herein by reference.

Other methods of optical 3D mapping project different sorts of patterns onto the object to be mapped. For example, PCT International Publication WO 2008/120217, whose disclosure is incorporated herein by reference, describes an illumination assembly for 3D mapping that includes a single transparency containing a fixed pattern of spots. A light source transilluminates the transparency with optical radiation so as to project the pattern onto an object. An image capture assembly captures an image of the pattern on the object, and the image is processed so as to reconstruct a 3D map of the object.

Still other methods of 3D mapping use a stereoscopic approach: Typically, two or more cameras at different positions capture respective images of the object. A computer analyzes the images to find the relative pixel offset of features of the object between the two images. The depths of the features are proportional to the respective offsets.

SUMMARY

Embodiments of the present invention that are described hereinbelow provide devices and methods for generation of 3D maps based on image data. In some embodiments, a 3D map of an object is created by processing an image of a pattern that is projected onto the object in combination with stereoscopic image analysis.

There is therefore provided, in accordance with an embodiment of the invention, a method for depth mapping, including projecting a pattern of optical radiation onto an object. A first image of the pattern on the object is captured using a first image sensor, and the first image is processed to generate pattern-based depth data with respect to the object. A second image of the object is captured using a second image sensor, and the second image is processed together with another image to generate stereoscopic depth data with respect to the object. The pattern-based depth data is combined with the stereoscopic depth data to create a depth map of the object.

In some embodiments, processing the second image together with the other image includes processing the second image together with the first image. In a disclosed embodiment, projecting the pattern includes projecting infrared (IR) radiation onto the object, and capturing the first image includes capturing the IR radiation that is reflected from the object, while capturing the second image includes capturing a color image of the object. Typically, the color image includes pixels, and the depth map includes depth values, and the method includes outputting the color image to a display together with the depth coordinates that are associated with the pixels.

Additionally or alternatively, projecting the pattern includes projecting multiple spots onto the object, and processing the first image includes finding respective transverse shifts between the spots on the object and the spots in a reference image of the pattern, and computing the depth data based on the transverse shifts.

Combining the pattern-based depth data with the stereoscopic depth data may include computing respective measures of confidence associated with the pattern-based depth data and stereoscopic depth data, and selecting depth coordinates from among the pattern-based and stereoscopic depth data responsively to the respective measures of confidence.

In some embodiments, combining the pattern-based depth data with the stereoscopic depth data includes defining multiple candidate depth coordinates for each of a plurality of pixels in the depth map, and selecting one of the candidate depth coordinates at each pixel for inclusion in the depth map. The multiple candidate depth coordinates may include, for at least some of the pixels, a null coordinate indicating that no valid depth coordinate was found. In a disclosed embodiment, selecting the one of the candidate depth coordinates includes applying weighted tensor voting among the pixels in order to select the one of the candidate depth coordinates based on the candidate depth coordinates at neighboring pixels.

In a disclosed embodiment, combining the pattern-based depth data with the stereoscopic depth data includes applying a calibration procedure to the first and second images so as to correct for a misalignment between the first and second images. Typically, applying the calibration procedure includes correcting for a change in alignment between the pattern of optical radiation and the first image sensor.

There is also provided, in accordance with an embodiment of the invention, a method for depth mapping, including receiving at least one image of an object, captured by an image sensor, the image including multiple pixels. The at least one image is processed to generate depth data including multiple candidate depth coordinates for each of a plurality of the pixels. A weighted voting process is applied to the depth data in order to select one of the candidate depth coordinates at each pixel. A depth map of the object is outputted, including the selected one of the candidate depth coordinates at each pixel.

In a disclosed embodiment, processing the at least one image includes computing respective measures of confidence associated with the candidate depth coordinates, and applying the weighted voting process includes weighting votes for the candidate depth coordinates responsively to the respective measures of confidence.

In some embodiments, applying the weighted voting process includes applying weighted tensor voting among the pixels in order to select the one of the candidate depth coordinates based on the candidate depth coordinates at neighboring pixels. Typically, applying the weighted tensor voting includes computing a weighted sum of covariance matrices over the neighboring pixels, and selecting the one of the candidate depth coordinates based on a difference between eigenvalues of the summed covariance matrices.

There is additionally provided, in accordance with an embodiment of the invention, apparatus for depth mapping, including an illumination subassembly, which is configured to project a pattern of optical radiation onto an object. A first image sensor is configured to capture a first image of the pattern on the object. At least a second image sensor is configured to capture at least a second image of the object. A processor is configured to process the first image to generate pattern-based depth data with respect to the object, to process a pair of images including at least the second image to generate stereoscopic depth data with respect to the object, and to combine the pattern-based depth data with the stereoscopic depth data to create a depth map of the object.

There is further provided, in accordance with an embodiment of the invention, apparatus for depth mapping, including at least one image sensor, which is configured to capture at least one image of an object, the image including multiple pixels. A processor is configured to process the at least one image to generate depth data including multiple candidate depth coordinates for each of a plurality of the pixels, to apply a weighted voting process to the depth data in order to select one of the candidate depth coordinates at each pixel, and to output a depth map of the object including the selected one of the candidate depth coordinates at each pixel.

There is moreover provided, in accordance with an embodiment of the invention, a computer software product, including a computer-readable medium in which program instructions are stored, which instructions, when read by a processor, cause the processor to receive a first image of a pattern that has been projected onto an object and to receive at least a second image of the object, and to process the first image to generate pattern-based depth data with respect to the object, to process a pair of images including at least the second image to generate stereoscopic depth data with respect to the object, and to combine the pattern-based depth data with the stereoscopic depth data to create a depth map of the object.

There is furthermore provided, in accordance with an embodiment of the invention, a computer software product, including a computer-readable medium in which program instructions are stored, which instructions, when read by a processor, cause the processor to receive at least one image of an object, the image including multiple pixels, to process the at least one image to generate depth data including multiple candidate depth coordinates for each of a plurality of the pixels, to apply a weighted voting process to the depth data in order to select one of the candidate depth coordinates at each pixel, and to output a depth map of the object including the selected one of the candidate depth coordinates at each pixel.

There is also provided, in accordance with an embodiment of the invention, a method for depth mapping, including capturing first and second images of an object using first and second image capture subassemblies, respectively. The first and second images are compared in order to estimate a misalignment between the first and second image capture subassemblies. The first and second images are processed together while correcting for the misalignment so as to generate stereoscopic depth data with respect to the object. A depth map is outputted including the stereoscopic depth data.

In a disclosed embodiment, comparing the first and second images includes selecting pixels in a first depth map responsively to the depth data, collecting statistics with respect to the selected pixels in subsequent images captured by the first and second image capture subassemblies, and applying the statistics in updating the estimate of the misalignment for use creating a second, subsequent depth map.

Comparing the first and second images may include estimating a difference in relative magnification between the first and second images and/or a shift between the first and second images. In a disclosed embodiment, correcting the misalignment includes applying corrected shift values $x_{nom}$ in generating the depth data, incorporating a correction $dx_{nom}$ given by a formula:

$$dx_{nom} = (dx_{meas} \cdot (1 + \alpha) - \beta \cdot (x_{real}^{image} - x_0) + \alpha \cdot (x_{real}^{image} - x_1)) \cdot \left(1 - \frac{B_{error}}{B_{nom}}\right)$$

wherein $dx_{meas}$ is a measured X-direction shift value at a pixel with a measured coordinate $x_{real}^{image}$ taken relative to center coordinates $x_0$ and $x_1$, $\alpha$ and $\beta$ are expansion and shrinking factors, and $B_{error}$ is baseline error in comparison to a baseline value $B_{nom}$.

There is additionally provided, in accordance with an embodiment of the invention, apparatus for depth mapping, including first and second image capture subassemblies, which are configured to capture respective first and second images of an object. A processor is configured to compare the first and second images in order to estimate a misalignment between the first and second image capture subassemblies, to process the first and second images together while correcting for the misalignment so as to generate stereoscopic depth data with respect to the object, and to output a depth map including the stereoscopic depth data.

The present invention will be more fully understood from the following detailed description of the embodiments thereof, taken together with the drawings in which:

DETAILED DESCRIPTION OF EMBODIMENTS

System Overview

Figure 1:
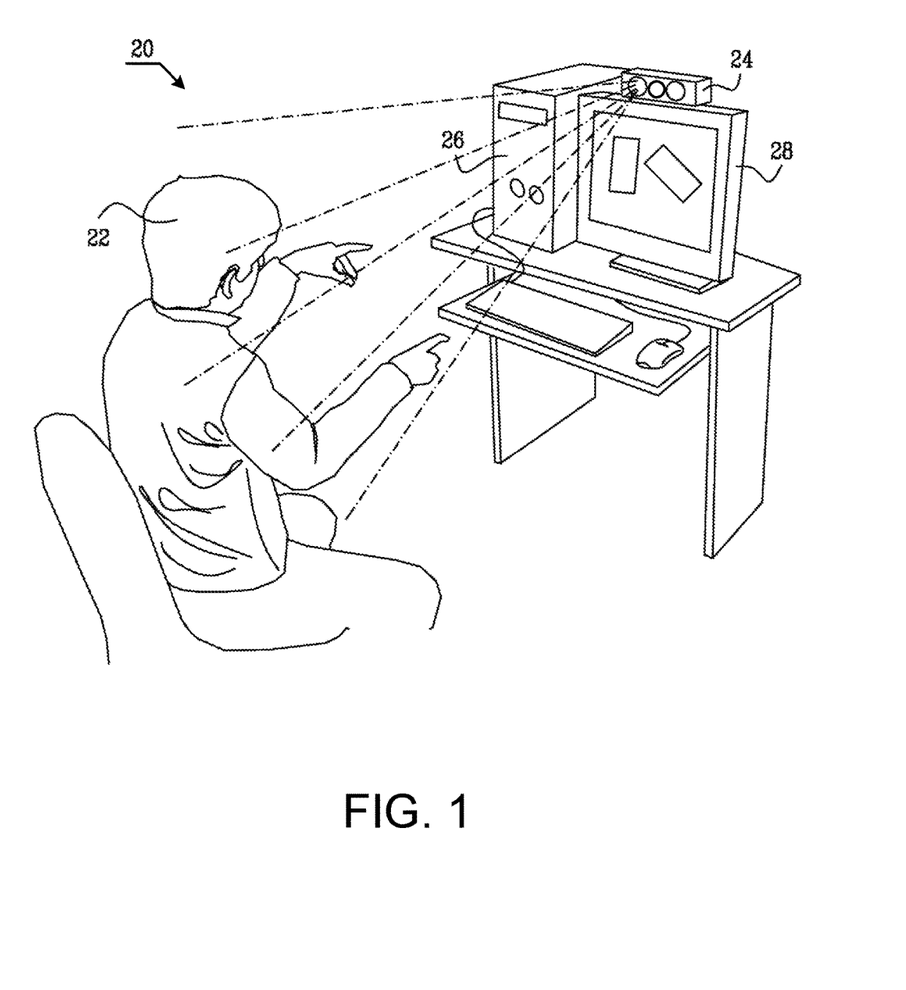
FIG. 1 is a schematic, pictorial illustration of a system for 3D mapping, in accordance with an embodiment of the present invention.

FIG. 1 is a schematic, pictorial illustration of a system 20 for 3D mapping and imaging, in accordance with an embodiment of the present invention. In this example, an imaging assembly 24 is configured to capture and process 3D maps and images of a user 22 (who is thus the "object" of system 20, as well as its operator). This information may be used by a host computer 26 as part of a 3D user interface, which enables the user to interact with games and other applications running on the computer. (This sort of functionality is described, for example, in U.S. Patent Application Publication 2009/0183125, whose disclosure is incorporated herein by reference.) This particular application of system 20 is shown here only by way of example, however, and the mapping and imaging capabilities of system 20 may be used for other purposes, as well, and applied to substantially any suitable type of 3D object.

In the example shown in FIG. 1, imaging assembly 24 projects a pattern of optical radiation onto the body (or at least parts of the body) of user 22, and captures an image of the pattern that appears on the body surface. The optical radiation that is used for this purpose is typically, although not necessarily, in the infrared (IR) range. A processor in assembly 24, whose functionality is described in greater detail hereinbelow, processes the image of the pattern in order to generate a depth map of the body, i.e., an array of 3D coordinates, comprising a depth (Z) coordinate value of the body surface at each point (X,Y) within a predefined field of view. (In the context of an array of image-related data, these (X,Y) points are also referred to as pixels.) In the embodiments that are described hereinbelow, the processor computes the 3D coordinates of points on the surface of the user's body by triangulation, based on transverse shifts of the spots in the pattern, as described in the above-mentioned PCT publications WO 2007/043036, WO 2007/105205 and WO 2008/120217. This technique is referred to herein as "pattern-based depth mapping."

In addition, imaging assembly 24 captures color (2D) images of the user. The imaging assembly registers and synchronizes the depth maps with the color images, thus providing the basis to reconstruct a 3D color image of the user. Assembly 24 generates a data stream that includes the depth maps and image data for output to computer 26. These functions of assembly 24 are described further in U.S. patent application Ser. No. 12/397,362, filed Mar. 4, 2009, which is assigned to the assignee of the present patent application and whose disclosure is incorporated herein by reference.

Furthermore, features of the color images and IR images that are captured by assembly 24 may be compared in order to generate additional depth information, using techniques of stereoscopic image analysis. This stereoscopic depth information may be used to supplement the pattern-based depth map, particularly in areas in which the image of the pattern is unclear (such as in areas that are very brightly lit or on areas of the object having low reflectivity). Details of this sort of stereoscopic supplementation of the pattern-based depth map are described further hereinbelow.

Computer 26 processes the data generated by assembly in order to extract 3D image information. For example, the computer may segment the depth map in order to identify the parts of the body of user 22 and find their 3D locations. Computer 26 may use this information in driving an output device, such as a display 28, typically to present 3D image information and/or user interface elements that may be controlled by movements of parts of the user's body. Generally, computer 26 comprises a general-purpose computer processor, which is programmed in software to carry out these functions. The software may be downloaded to the processor in electronic form, over a network, for example, or it may alternatively be provided on tangible media, such as optical, magnetic, or electronic memory media.

As another alternative, the processing functions that are associated here with computer 26 may be carried out by a suitable processor in assembly 24 or a processor that is integrated with display 28 (in a television set, for example) or with any other suitable sort of computerized device, such as a game console or media player.

Figure 2:
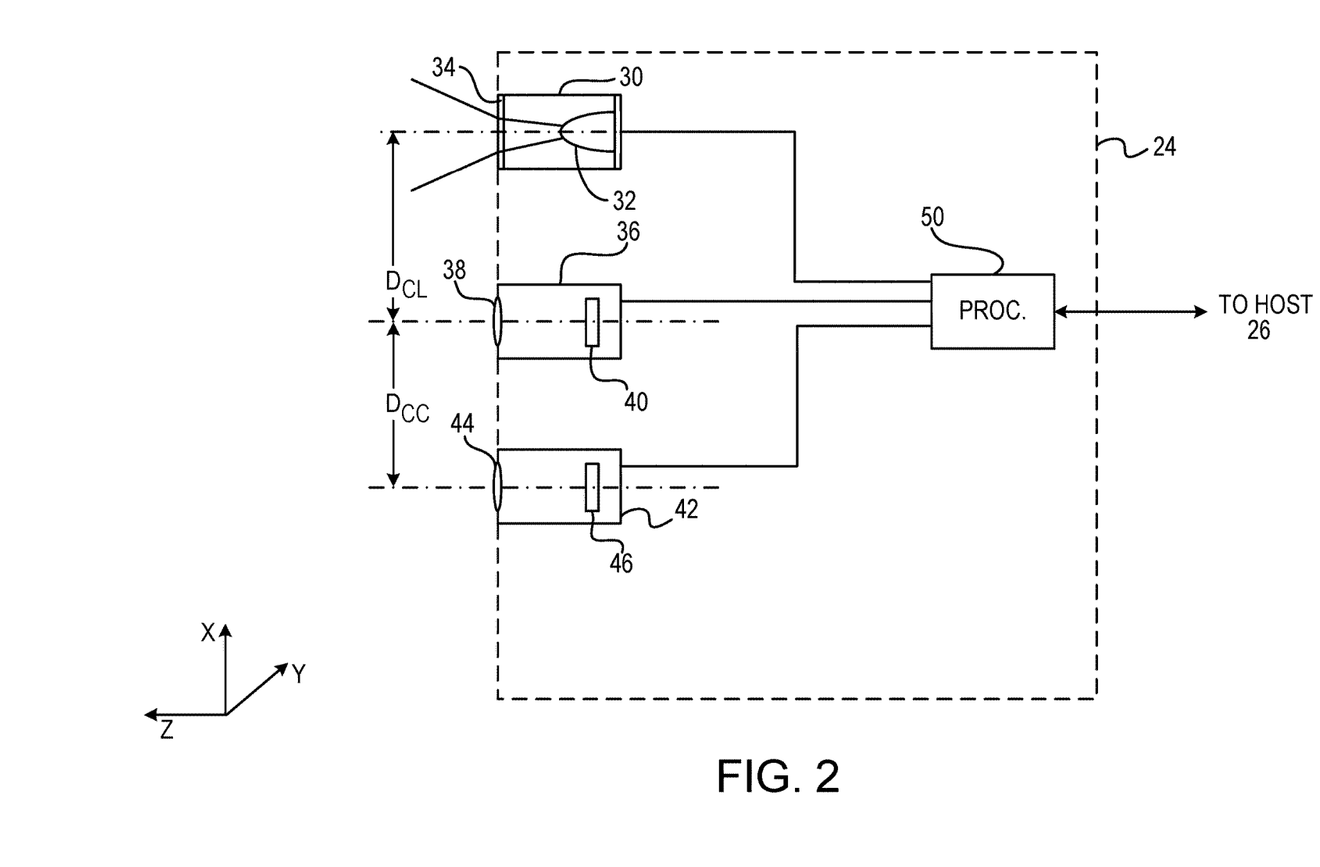
FIG. 2 is a schematic top view of an imaging assembly, in accordance with an embodiment of the present invention.

FIG. 2 is a schematic top view of imaging assembly 24, in accordance with an embodiment of the present invention. Here the X-axis is taken to be the horizontal direction along the front of assembly 24, the Y-axis is the vertical direction (into the page in this view), and the Z-axis extends away from assembly 24 in the general direction of the object being imaged by the assembly.

For 3D mapping, an illumination subassembly 30 illuminates the object with an appropriate pattern, such as a speckle pattern. For this purpose, subassembly 30 typically comprises a suitable radiation source 32, such as a diode laser, LED or other light source, along with optics, such as a diffuser 34 or a diffractive optical element, for creating the pattern, as described in the above-mentioned PCT publications. A depth image capture subassembly 36 captures an image of the pattern on the object surface. Subassembly 36 typically comprises objective optics 38, which image the object surface onto a detector 40, such as a CMOS image sensor.

As noted above, radiation source 32 typically emits IR radiation, although other radiation bands, in the visible or ultraviolet range, for example, may also be used. Detector 40 may comprise a monochrome image sensor, without an IR-cutoff filter, in order to detect the image of the projected pattern with high sensitivity. To enhance the contrast of the image captured by detector 40, optics 38 or the detector itself may comprise a bandpass filter, which passes the wavelength of radiation source 32 while blocking ambient radiation in other bands.

A color image capture subassembly 42 captures color images of the object. Subassembly 42 typically comprises objective optics 44, which image the object surface onto a detector 46, such as a CMOS color mosaic image sensor. Such a sensor is typically overlaid by a Bayer red-green-blue (RGB) mosaic filter, as is known in the art. Optics 44 or detector 46 may comprise a filter, such as an IR-cutoff filter, so that the pattern projected by illumination subassembly 30 does not appear in the color images captured by detector 46. Typically, subassembly 42 comprises one or more mechanisms for adapting to the intensity of the light reflected from the object including, for example, an electronic shutter, automatic gain control (AGC), and/or a variable iris. Subassembly 36 may be similarly configured.

A processor 50 receives and processes image inputs from subassemblies 36 and 42. Processor 50 typically comprises an embedded microprocessor, which is programmed in software (or firmware) to carry out the processing functions that are described hereinbelow. The software may be provided to the processor in electronic form, over a network, for example; alternatively or additionally, the software may be stored on tangible computer-readable media, such as optical, magnetic, or electronic memory media. Processor also comprises suitable input and output interfaces and may comprise dedicated and/or programmable hardware logic circuits for carrying out some or all of its functions. Details of some of these processing functions and circuits that may be used to carry them out are presented in the above mentioned U.S. patent application Ser. No. 12/397,362.

Briefly put, processor 50 compares the image provided by subassembly 36 to a reference image of the pattern projected by subassembly 30 onto a reference plane at a known distance from assembly 24. (The reference image may be captured as part of a calibration procedure and stored in a memory, for example.) The processor matches the local patterns in the captured image to those in the reference image and thus finds the transverse shift for each pixel, or group of pixels, within the plane. Based on these transverse shifts and on the known distance $D_{cL}$ between the optical axes of subassemblies 30 and 36, the processor computes a depth (Z) coordinate for each pixel. In addition, as noted above, the processor may supplement these pattern-based depth coordinates with stereoscopic depth information, which is derived from the images provided by both of subassemblies 36 and 42, on the basis of the known distance $D_{cc}$ between the respective optical axes.

Although FIG. 2 shows depth image capture subassembly 36 located between illumination subassembly and color image capture subassembly 42, other configurations of these elements may also be used. For example, in order to provide accurate stereoscopic depth information, it may be useful to place image capture subassemblies 36 and 42 on opposite sides of illumination subassembly 30. Spacing the subassemblies equally along the X-axis in this sort of configuration is useful in facilitating registration of the pattern-based and stereoscopic depth information. A spacing of 7-10 cm between the optical axes of the image capture subassemblies and the illumination subassembly has been found to give good results in the sort of application that is illustrated in FIG. 1. As another example, subassemblies 36 and 42 may be spaced apart in the Y-direction (which projects out of the page in the view shown in FIG. 2).

Alternatively, other system configurations may be used for the purposes described herein and are considered to be within the scope of the present invention.

Processor 50 synchronizes and registers the depth coordinates in each 3D map with appropriate pixels in the color images captured by subassembly 42. The registration typically involves a shift of the coordinates associated with each depth value in the 3D map. The shift includes a static component, based on the distance $D_{cc}$ between the optical axes of subassemblies 36 and 42 and any misalignment between the detectors, as well as a dynamic component that is dependent on the depth coordinates themselves. The registration process is described in the above-mentioned U.S. patent application Ser. No. 12/397,362.

Misalignment among the components of assembly 24 and distortion due to non-ideal behavior of these components may be calibrated, and appropriate correction factors may be computed to correct for this misalignment and distortion. These correction factors are applied by processor 50 in computing the depth coordinates. A procedure for performing such calibration is described hereinbelow with reference to FIG. 5. The procedure may be carried out before system 20 begins operation and then may be repeated intermittently during operation in order to compensate for dynamic changes that occur over time, due to temperature changes in assembly 24, for example.

After registering the depth maps and color images, processor 50 outputs the depth and color data via a port, such as a USB port, to host computer 26.

Overview of the Depth Mapping Technique

The inventors have found that by itself, pattern-based depth mapping, as described above, generally gives more accurate and robust results than do stereoscopic techniques. Under some circumstances, however, pattern-based methods do not work well, for example:

1) When the object to be mapped is very brightly illuminated and/or highly reflective, the image of the pattern may be "washed out" by the non-patterned illumination that is reflected from the object. Under these circumstances, the relative contrast of the pattern in the image captured by subassembly 36 may be too low to enable reliable detection.
2) When an area of the object has very low reflectance in the spectral range of the pattern (such as near-IR), the contrast of the pattern in the image captured by subassembly 36 may again be too low to enable reliable detection.
3) When IR illumination is used to project the pattern onto the object, there may be weak areas in the pattern, patterned areas in the object or areas that suffer from high geometrical distortion and, as a result, "holes" in the depth map.

Under such conditions, the depth map that is generated on the basis of the pattern alone may contain "holes"-areas of the object for which no reliable depth coordinates are available.

In some embodiments of the present invention, these holes are filled in by means of stereoscopic depth mapping. In stereoscopic techniques that are known in the art, two or more cameras, spaced apart by a known distance, capture images of the same scene. The same image features appear in both images, but at locations in the respective images that are relatively offset by parallax due to the spacing of the cameras and the distance of the features from the camera plane. The measured offset of a given feature, together with the known spacing between the cameras, is thus used to compute the depth coordinate of the feature.

Usually, the multiple cameras that are used in a stereoscopic system are of the same type and characteristics. In the embodiment shown in FIG. 2, however, two different types of cameras are used: the IR camera embodied in subassembly 36 and the RGB color camera embodied in subassembly 42. The cameras, of course, have different spectral responses and may also have different-sized pixels. Both of these cameras, however, are present in system 20 anyway, in order to enable the computer to reconstruct a 3D color image of the object. Therefore, the use of these two heterogeneous cameras for stereoscopic depth mapping comes at little or no additional hardware cost and requires only that additional processing be applied to the images that are output by the cameras.

In bright areas of the object (case 1 above) in which the IR camera is unable to capture an image of the projected pattern, both the IR and RGB cameras are still generally able to form an image of the object itself without undue difficulty, since there is plenty of available light. (The electronic shutter, AGC, and/or iris adjustment may be used to reduce sensor saturation if the image is too bright.) Even in dark areas of the object (case 2 above), there may be sufficient bright highlights or other low-amplitude image information, such as edges, in the IR and RGB images to enable the processor to make a meaningful comparison.

Processor 50 stereoscopically measures the local offset between the IR and RGB images and thus obtains depth coordinates of these features based on the distance $D_{cc}$ between the optical axes of the cameras. These depth coordinates are inherently registered with the RGB image. The processor may apply any method of stereoscopic processing that is known in the art. For example, the processor may identify specific image features in the IR and RGB images and compute the offset between the features. Additionally or alternatively, after an appropriate image rescaling and alignment, the processor may calculate a normalized cross-correlation over areas or features in the IR and RGB images for different values of offset between the images. The offset that maximizes the cross-correlation is chosen and thus gives the depth coordinate of the pixel. Alternatively, a mutual information calculation, as is known in the art, may be used to find the offset between the locations of a given feature or area in the two images. Thus, both bright and dark holes in the pattern-based depth map may be filled in with stereoscopic depth information, giving a more complete, accurate and robust 3D picture of the object.

Processor 50 combines the stereoscopic coordinates with the pattern-based coordinates to form a unified depth map. For this purpose, the processor may choose, for each pixel or group of pixels, between the stereoscopic and the pattern-based depth coordinates in order to build the optimal depth map. In one embodiment, which is described in greater detail hereinbelow, the processor computes pattern-based and stereoscopic depth data over the entire field of view of imaging assembly 24. It thus may find multiple candidate depth coordinates for each pixel, and may assign respective confidence values to the different candidate coordinates. The processor then performs a process of weighted voting in order to choose the best candidate depth at each pixel. Alternatively, the processor may apply other methods to blend the stereoscopic and pattern-based depth coordinates.

Although the "object" in the example shown in FIG. 1 is the body of a human being, the principles of the present invention may be applied in mapping and imaging of substantially any type of 3D object. Furthermore, although in system 20 the IR camera embodied in subassembly 36 is used for both pattern-based and stereoscopic depth measurements, the stereoscopic measurements may alternatively be made by a separate pair of cameras.

Depth Mapping Using Weighted Voting

Figure 3:
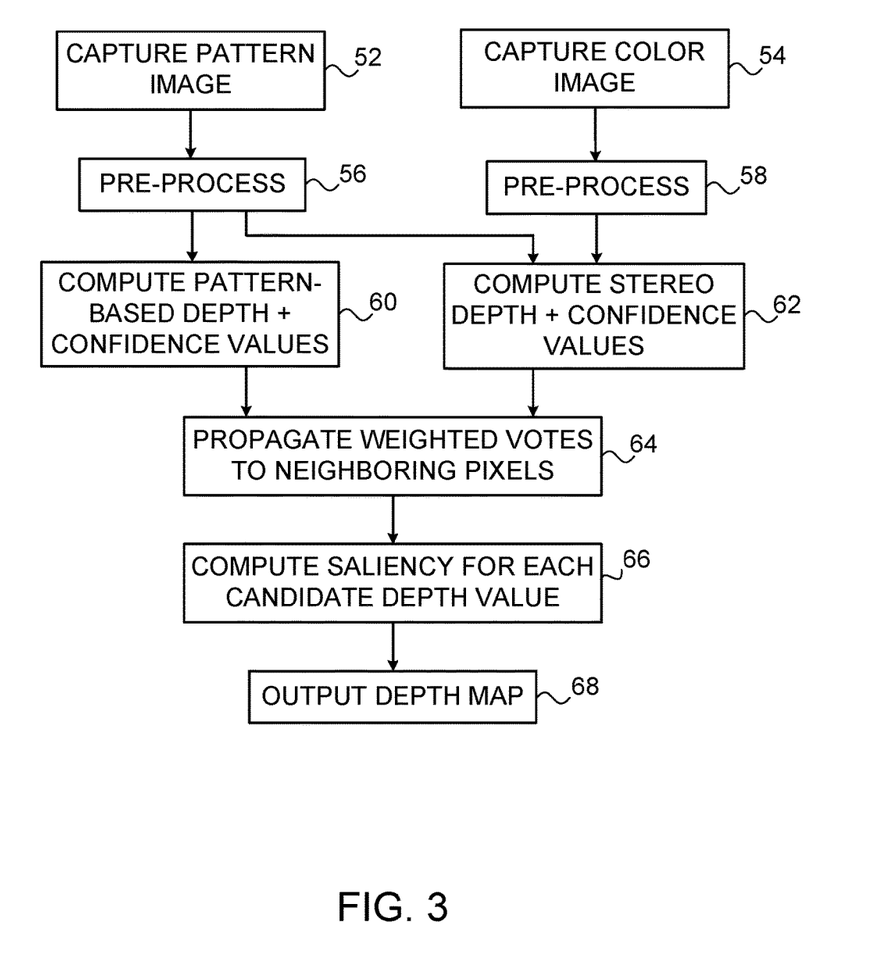
FIG. 3 is a flow chart that schematically illustrates a method for 3D mapping.

FIG. 3 is a flow chart that schematically illustrates a method for 3D mapping, in accordance with an embodiment of the present invention. This method is described hereinbelow, for the sake of clarity, with reference to the system components shown in FIGS. 1 and 2 above. The principles of the method, however, may similarly be applied in other system configurations. For example, the method may be carried out using separate subassemblies for pattern-based and stereoscopic imaging, rather than using a single subassembly in both functions (such as subassembly 36, as described above). Additionally or alternatively, the pattern-based depth values may be found using other types of projected patterns, such as structured light or Moiré patterns.

To begin the process in system 20, illumination subassembly 30 projects a pattern onto the object. Image capture subassembly 36 captures an image of the pattern appearing on the object, at a pattern capture step 52, while image capture subassembly 42 captures a color image of the object, at a color image capture step 54. Processor 50 pre-processes each of the captured images, at pre-processing steps 56 and 58. For purposes of comparison with the IR image, the processor typically converts the color (RGB) image to monochrome form. For example, the processor may compute the luminance value of each pixel (or group of R, G and B pixels), or it may take the maximum or the sum of the R, G and B values. Processor 50 may also enhance the image contents in steps 56 and 58, by performing pre-processing operations, such as sharpening, on the raw input data.

Based on the IR image (possibly following the pre-processing step), processor 50 computes pattern-based depth coordinates for all pixels in the image, at a pattern-based depth computation step 60. An implementation of this step is described in detail, for example, in the above-mentioned U.S. patent application Ser. No. 12/397,362. At this step, as noted above, processor 50 matches the local patterns in the captured IR image to those in a stored reference image and thus finds the transverse shift for each pixel. This shift is indicative of the depth coordinate of the pixel relative to the reference plane.

To match the local patterns in the captured image with local patterns in the reference image at step 60, the processor may perform a local matching operation, such as a cross-correlation, sum of absolute differences, minimum square error or other techniques of local matching that are known in the art. Alternatively or additionally, processor 50 may use other techniques in matching local patterns in the IR and color images. Such techniques include, for example, computing a sum of square differences (SSD) between the local patterns, as well as ordinal measures (as described, for example, by Bhat and Nayar, in "Ordinal Measures for Image Correspondence," *IEEE Transactions on Pattern Analysis and Machine Intelligence* 20:4 (1998), pages 415-423, which is incorporated herein by reference). The processor computes a local match score for each candidate shift value at each pixel or group of pixels, indicating the quality of the match. Typically, when image conditions are good, the depth coordinate at each pixel corresponds to the shift that gives the highest local match score according to one of the above metrics.

In practice, however, the local match results may not be unequivocal due to non-ideal image quality. For example, there may be two or more different shifts that give local maxima in the local match score, or the local match scores may be low for all shifts due to poor lighting conditions or shadows. Therefore, rather than simply choosing a single depth value at step 60, processor 50 may take two (or more) depth coordinates corresponding to the shifts that gave the best local match scores. These depth coordinates are treated at this stage as candidate depth values. The processor saves the respective local match score together with each candidate depth coordinate as a measure of confidence that the coordinate is correct.

Processor 50 computes stereo-based depth coordinates for all pixels, at a stereo depth computation step 62. In this step, the processor compares each vicinity in the IR image to a set of shifted vicinities in the color image (following pre-processing of both images, as explained above), or vice versa. As in step 60, the processor typically computes a local match score for each possible shift and chooses the shift that gives the best local match score as indicating the candidate depth coordinate. As in step 60, multiple candidates may be chosen, and the local match scores themselves may be used as confidence measures.

In some cases, imaging assembly 24 may be unable to find any legitimate depth candidate for a given pixel or region in the image. For example, processor 50 may be unable to compute any candidate depth with reasonable confidence for pixels that are in areas of shadow or in highly-reflective areas or that represent objects that are too far or too close for their depth to be sensed by assembly 24. In such cases, it is generally preferable that processor 50 output a null depth value at the pixels in question, indicating that no valid depth coordinate was found, rather than an incorrect value. Therefore, when there is no shift between the IR and color images at a given pixel that gives a confidence measure that is above a certain predetermined threshold in step 62, processor 50 may choose a null, "no-depth" coordinate as one of the depth candidates for that pixel. The confidence measure associated with this null candidate may be taken to be a reciprocal of the highest cross-correlation value (such as one minus the cross-correlation) that was computed for any shift at the given pixel.

Following steps 60 and 62, each pixel in the field of view of imaging assembly 24 has multiple candidate depth coordinates, each with an associated confidence measure (also referred to as a confidence score). Ideally, the candidate depths at any given pixel may be identical, or nearly so, but frequently they are not, and the correct depth choice is not necessarily the one with the highest score. On the other hand, the correct 3D coordinates are usually those that make up, together with their near and more distant neighbors, smooth surfaces in 3D space.

Therefore, in order to choose among the candidate depth coordinates at each pixel, processor 50 compares each candidate to the candidate depth coordinates of other pixels within a certain neighborhood. Various methods may be used for this purpose. In one embodiment, which is described in greater detail hereinbelow, processor 50 uses a method of tensor voting, in which each pixel casts "votes" for the candidate depth coordinates at neighboring pixels, in a voting step 64. The principles of this sort of tensor voting are described in detail by Mordohai and Medioni, in *Tensor Voting: A Perceptual Organization Approach to Computer Vision and Machine Learning* (Morgan and Claypool, 2006), which is incorporated herein by reference. The votes are directed (in tensor space) and weighted according to the candidate depth coordinates and corresponding confidence values at the neighboring pixels.

Processor 50 accumulates the weighted votes for each candidate depth coordinate at each pixel, and sums these votes in order to compute a saliency value for each candidate, at a saliency computation step 66. The saliency computation (as explained by Mordohai and Medioni) gives an indication of the orientation of a surface that is inferred to pass through the candidate coordinate, as well as a level of confidence that the surface actually exists in 3D space. Processor 50 chooses the depth candidate at each pixel that has the highest saliency, and incorporates the chosen coordinates in a depth map, at a map output step 68. The inventors have found this voting method to give accurate, smooth integration between pattern-based and stereo-based 3D coordinates. System 20 is thus able to generate smooth, accurate depth maps over most or all of the field of view of assembly 24 notwithstanding variations in lighting, depth and reflectivity of the object.

Figure 4A:
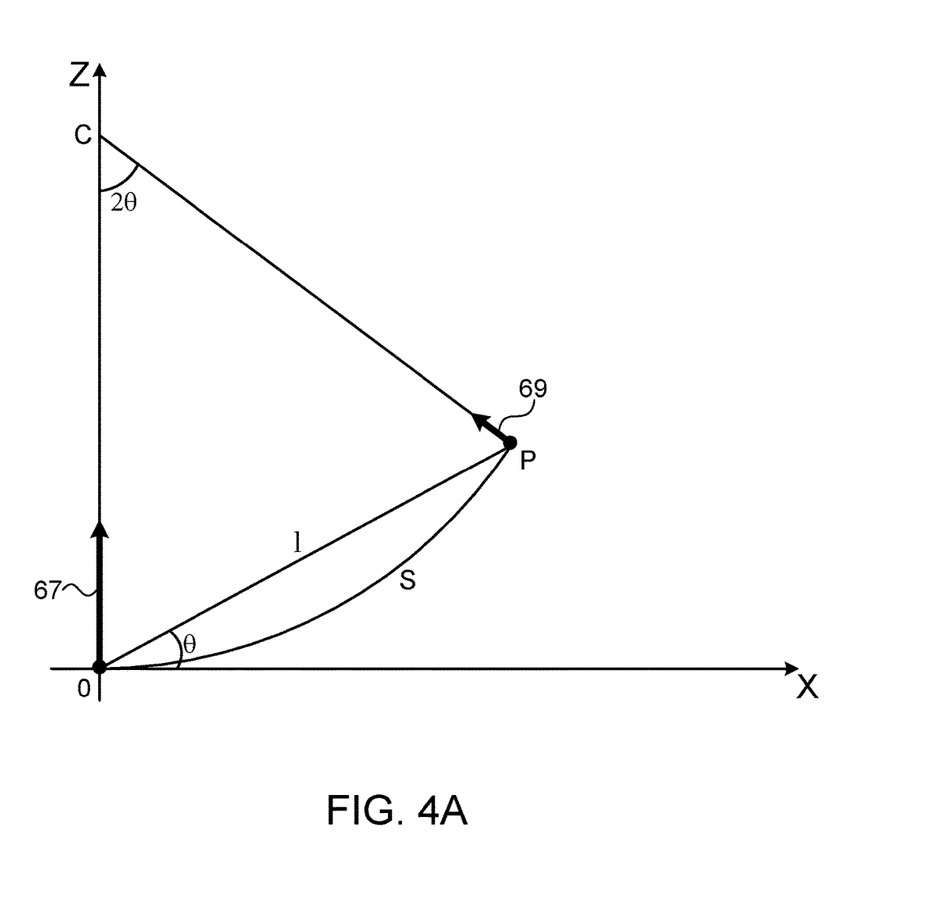
FIG. 4A is a diagram that schematically illustrates a voting tensor used in 3D mapping, in accordance with an embodiment of the present invention.
Figure 4B:
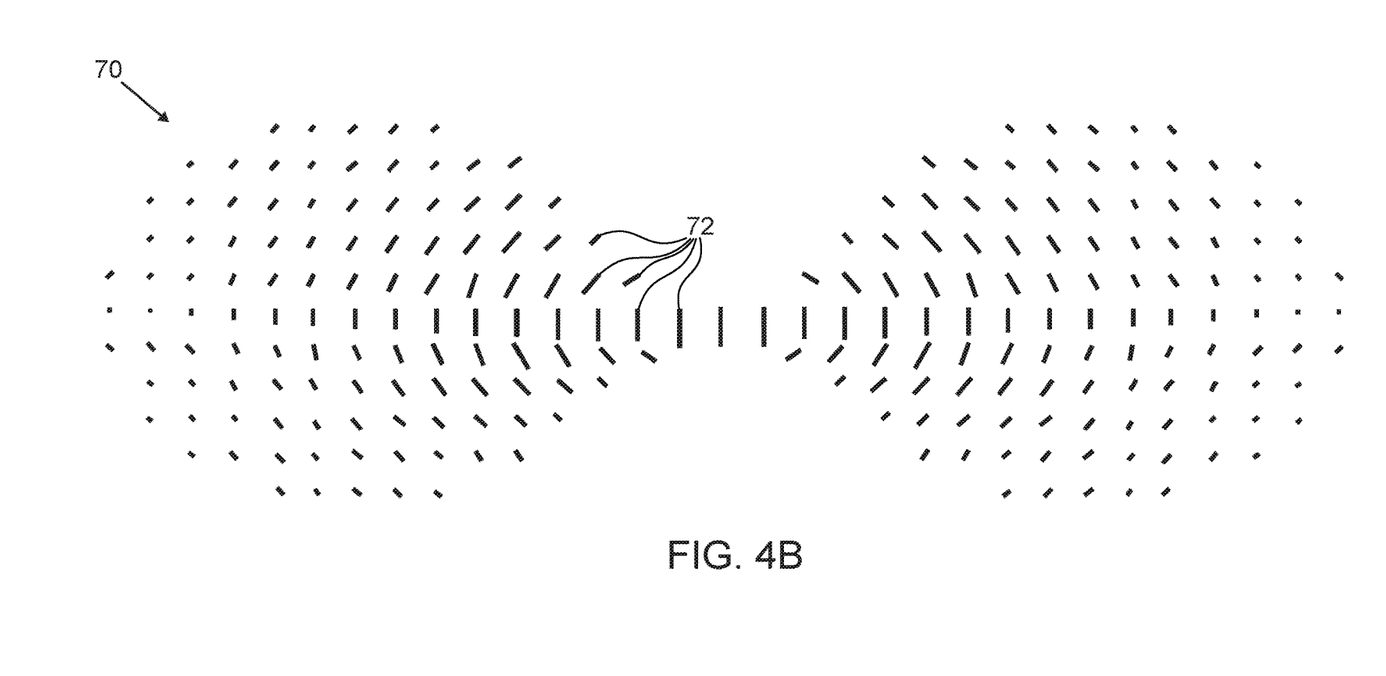
FIG. 4B is a diagram that schematically illustrates a voting field used in 3D mapping, in accordance with an embodiment of the present invention.

Reference is now made to FIGS. 4A and 4B, which are diagrams that schematically illustrate the principles of tensor voting, in accordance with an embodiment of the present invention. These diagrams will be used below in explaining the details of this method of depth computation. FIG. 4A shows a normal vector 69, which is used to create a voting tensor, while FIG. 4B shows a voting field 70. Both figures are limited, for the sake of visual clarity, to the X-Z plane. Because of rotational symmetry about the Z-axis, however, the tensors and voting field will have the same form in the Y-Z plane or in any other plane containing the Z-axis.

At step 64 (FIG. 3) each candidate depth (Z) coordinate at a given pixel (X,Y) collects the votes of the candidate depth coordinates from all pixels within a predetermined neighborhood. The neighborhood in the present embodiment is taken to be bounded by a radius of 11 pixels and an inclination angle of 38° out of the X-Y plane (so that candidate values with large depth differences at nearby pixels do not vote for one another). The value of the vote cast by each candidate in the neighborhood is given by:

$$\text{Vote} = (\text{confidence score}) \cdot \text{saliency} \cdot \text{cov}(n) \quad (1)$$

Here the confidence score is the value computed at step 60 or 62, as described above, and the saliency and covariance of the vector n (which is a voting tensor, describing a surface with n as its surface normal) are defined below.

FIG. 4A shows vectors 67 and 69, which are used to create the appropriate voting tensors and associated geometrical constructs that are used in computing the covariance and the saliency. In the diagram, the candidate coordinate that is collecting the votes of the neighboring pixels is taken to be at the origin O (0,0,0) and is assumed initially to be on a surface tangent to the X-Y plane at O. A unit vector 67, of the form [0,0,1], represents the normal to this plane at O. A candidate depth coordinate at a neighboring pixel (X,Y) is represented as point P(X,Y,Z) in 3D space. Vector 69 represents the normal at P to a surface passing through O and P. The surface is defined by the osculating circle that is perpendicular to vector 67 at O and passes through P, as shown in the figure. The vector 69 is used to create a voting tensor.

The weight given to the tensor created by vector 69 is adjusted according to the saliency S, which is a function of the tensor geometry shown in FIG. 4A:

$$S(s, \kappa) = e^{-\left(\frac{s^2 + c\kappa^2}{\sigma^2}\right)} \quad (2)$$

wherein $$s = \frac{\theta l}{\sin\theta}, \kappa = \frac{2\sin\theta}{l},$$

l is the length of the ray between O and P, and θ is the angle between this ray and the X-Y plane. The values of c and σ define the scale of voting. For the 11-pixel radius mentioned above, σ=8, and $$c = \frac{-16\log(0.1) * (\sigma - 1)}{\pi^2}.$$

It can be seen that the saliency decays with distance from the origin and with angle out of the plane. Thus, nearby pixels with similar candidate depth coordinates will have high saliency in voting for a given candidate, while farther pixels and highly different candidate depth coordinates will have little or no saliency.

Voting field 70 in FIG. 4B shows tensors 72 that are applied in voting at step 64. (This figure shows a slice through the field in the X-Z plane, as noted above.) Each tensor 72 represents a possible (X,Y,Z) candidate coordinate in the neighborhood of the candidate at the center of field 70 that is collecting the votes. The weight of each tensor is given by the saliency, in accordance with equation (2). The direction is given by the geometry shown in FIG. 4A and can be computed as follows for vector $n=[n_x \ n_y \ n_z]$ at pixel (X,Y) with candidate depth Z:

$$n_x = \frac{-X\sin 2\theta}{\sqrt{X^2 + Y^2}} \quad (3)$$

$$n_y = \frac{-Y\sin 2\theta}{\sqrt{X^2 + Y^2}}$$

$$n_z = \text{sign}(Z) * \cos 2\theta$$

The covariance term (voting tensor) in equation (1) is then given by:

$$\text{cov}(n) = \begin{bmatrix} n_x^2 & n_x n_y & n_x n_z \\ n_x n_y & n_y^2 & n_y n_z \\ n_x n_z & n_y n_z & n_z^2 \end{bmatrix} \quad (4)$$

The voting formula of equation (1) may be modified to give greater weight to "anchors," meaning candidate depth values that are closely tied to the candidate that is collecting the votes. Such anchors are typically characterized by high confidence scores (above a selected threshold) and coordinates near the origin (for example, with X, Y and Z coordinates between +2 and −2). In collecting and summing the votes from these anchor candidates, processor 50 may multiply the values given by equation (1) by an enhancement factor, which is typically a number in the range between 2 and 6. Processor 50 will then favor these anchors when choosing candidates to include in the output depth map.

Null, "no-depth" candidates have an artificial Z coordinate, which is chosen to be out of the range of voting field 70 for actual, non-null depth coordinates. Thus, no-depth candidates will vote only for one another (with saliency values computed with θ=0). Typically, neighboring no-depth candidates do not receive the type of "anchor" enhancement that is described above.

Summing the votes given by equation (1) for all neighbors of a given candidate, at step 66 (FIG. 3), results in a 3×3 covariance sum matrix. The eigenvector of this matrix with the largest eigenvalue represents the normal to a surface that is inferred to pass through the candidate depth at pixel (X,Y) based on the votes of the neighboring pixels. The difference between the largest eigenvalue and the next-largest eigenvalue gives a measure of the confidence of this inference: The greater the difference, the stronger the confidence that the inference is correct.

In the method of FIG. 3, however, there is no need for processor 50 to extract the actual eigenvectors or even the eigenvalues. Rather, it is sufficient that the processor estimate the difference between the two largest eigenvalues of the covariance sum matrix. The eigenvalue difference for each of the different depth candidates at (X,Y) indicates the overall saliency for that depth candidate, including no-depth candidates. Therefore, the eigenvalue differences give a reliable measure of confidence in each candidate. Processor 50 chooses, at each pixel (X,Y), the depth candidate with the highest saliency for inclusion in the depth map at step 68.

Although the embodiment of FIGS. 3, 4A and 4B uses a particular method and algorithm for choosing the best depth candidate at each pixel, the principles of the present invention may be applied using other methods to combine the results of pattern-based and stereo-based depth mapping. For example, depth mapping results may be combined using belief propagation techniques, as described by Zhu et al. in "Fusion of Time-of-Flight Depth and Stereo for High Accuracy Depth Maps," Proceedings of the IEEE Conference on Computer Vision and Pattern Recognition, (2008), which is incorporated herein by reference.

Other methods that may be used in this context are based on Markov random field (MRF) models. Although the MRF framework yields an optimization problem that is NP hard, good approximation techniques based on graph cuts and on belief propagation have been developed and demonstrated for stereo and image restoration. The use of graph cuts is described, for example, by Boykov et al., in "Fast Approximate Energy Minimization Via Graph Cuts," *IEEE Transactions on Pattern Analysis and Machine Intelligence* 23(11), pages 1222-1239(2001). Belief propagation methods are described by Weiss et al., in "On the Optimality of Solutions of Themax-Product Belief Propagation Algorithm in Arbitrary Graphs," *IEEE Transactions on Information Theory* 47(2), pages 723-735 (2001); and by Sun et al., in "Stereo Matching Using Belief Propagation," *IEEE Transactions on Pattern Analysis and Machine Intelligence* 25(7), pages 787-800 (2003). Felzenszwalb et al., in "Efficient Belief Propagation for Early Vision," *International Journal of Computer Vision* 70:1, pages 41-54 (2006), describe in detail belief propagation algorithm for stereo matching and show good experimental results on standard images used for the evaluation of stereo matching algorithms. The above-mentioned publications are incorporated herein by reference. The methods they describe are useful both in the sense that the local minima they find are minima over "large neighborhoods," and in the sense that they produce highly accurate results in practice.

Furthermore, the methods of weighted voting that are described above may similarly be used in choosing among multiple depth values generated by other techniques, including multiple candidate depth values that may be generated using a single mapping technique (such as pattern-based mapping alone).

Correction of Misalignment

Figure 5:
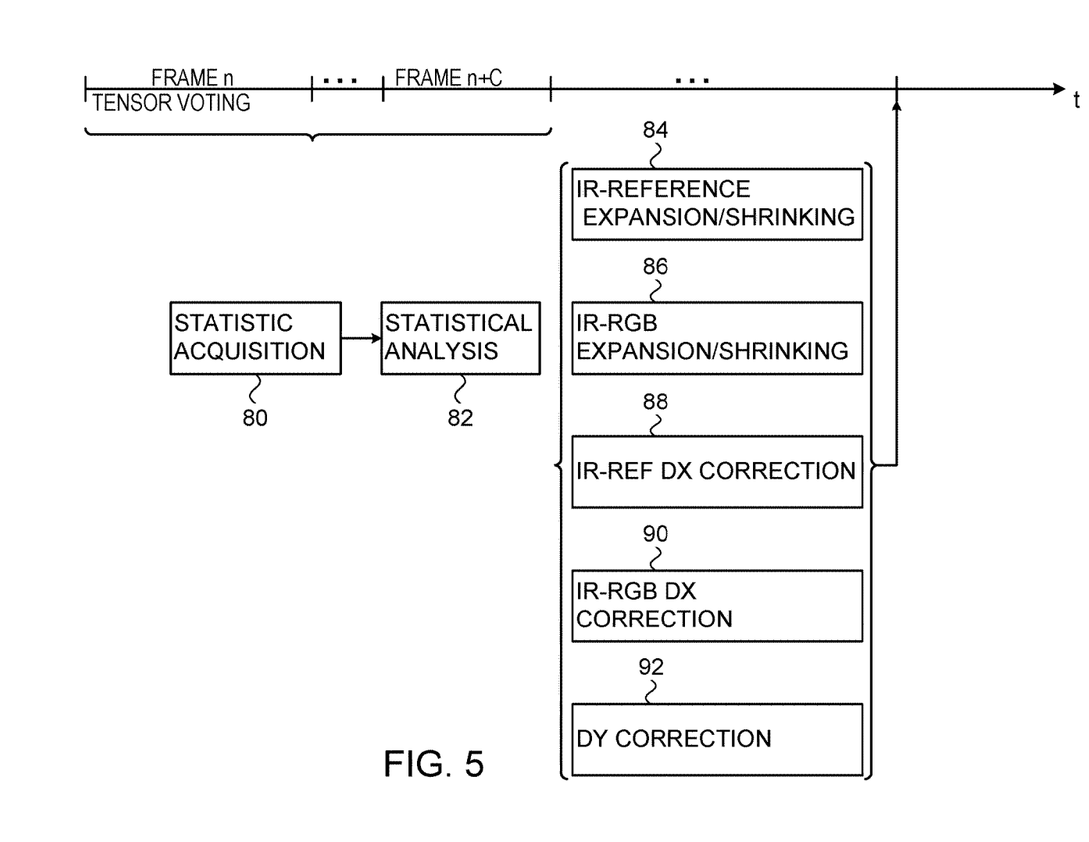
FIG. 5 is a flow chart that schematically illustrates a method for computing calibration factors in a system for 3D mapping, in accordance with an embodiment of the present invention.

FIG. 5 is a flow chart that schematically illustrates a method for computing calibration factors in imaging assembly 24, in accordance with an embodiment of the present invention. This method is carried out periodically by processor 50 (FIG. 2) in order to detect and compensate for sources of error that cause the locations and optical performance of illumination subassembly 30 and of depth and color image capture subassemblies 36 and 42 to deviate from the ideal. These effects are referred to herein collectively as "misalignment."

For example, during operation of system 20, optical components may expand or contract, relative locations of the subassemblies may shift, and the angular magnification of the projected pattern may change. These changes can distort the depth measurements and can alter the relative positions of the IR and RGB images, which may cause the tensor voting process to fail. The calibration process of FIG. 5 dynamically computes and updates correction factors, which processor 50 then applies in correcting the misalignment and thus restoring the IR and RGB image data to nominal, registered pixel coordinates.

For each cycle of calibration, processor 50 acquires image statistics over a sequence of C frames captured by imaging assembly 24, at a statistics acquisition step 80. C is a configurable parameter, which can be set depending on the relative stability or instability of the operating conditions of system 20. The statistics collected typically include, at each selected pixel (X,Y), the following shift values in the X and Y coordinates:

dxr—the X-direction shift of the IR image relative to the reference image;
dyr—the Y-direction shift of the IR image relative to the reference image;
dxs—the X-direction shift of the RGB image relative to the IR image; and
dys—the Y-direction shift of the RGB image relative to the IR image.

Processor 50 typically collects the statistics at pixels where both the IR and the RGB image capture subassemblies gave valid results. For example, the processor may select pixels at which the confidence values computed at steps 60 and 62 (FIG. 3) for the pattern-based and stereo depth measurements are above a selected threshold. For still stronger validation, the processor may choose only pixels at which the stereo candidate depth value won the tensor voting process. To help ensure the validity of the statistics, the processor may search for runs of pixels having the same depth value, and then choose each pixel to sample from the middle of such a run.

Processor 50 analyzes the statistics in order to estimate distortion and shift, as a function of pixel coordinates (X,Y), for the IR image relative to the reference and the RGB image relative to the IR image, at a statistical analysis step 82. The analysis takes the results of the previous iteration through the calibration procedure as its point of departure, and computes changes in the calibration parameters relative to the previous values.

At this step, processor 50 may make use particularly of the Y-direction distortion and shift values, since they are (ideally) independent of the depth. Thus, Y-direction deviation between the IR image and the reference image may be attributed to magnification of the projected pattern due to wavelength changes or movement of the projection lens, or due to relative movement of the IR image capture subassembly or its components. Y-direction deviation between the RGB image and the IR image may be attributed to relative movement between the RGB and IR image capture subassemblies or their components.

Thus, for each pair of subassemblies (projection/IR image capture and RGB/IR image capture), the processor maps the Y-direction distortion and shift, DY, as a function of X and Y. The shift and distortion may be modeled as a linear function of the coordinates: $DY(X,Y)=A(X-X_c)+BY+C$. ($X_c$ represents the center of the image.) The parameters A, B and C may be computed by a least-squares fit over the pixel statistics that were collected at step 80.

Processor 50 uses the results of this analysis in computing a number of correction factors, in correction computation steps 84, 86, 88, 90 and 92. These factors include expansion and shrinking factors α and β, which are computed at steps 84 and 86 based on the DY values derived at step 82. These factors take into account movement of objective optics 38 and 44 relative to the respective image sensors for the IR-RGB stereo image comparison, as well as changes in the wavelength of radiation source 32 for the IR-reference depth image comparison. In addition, the processor uses the DY model described above to estimate relative changes in the displacements of the subassemblies in assembly 24, giving an error value $B_{error}$ (which may depend on local image coordinates), relative to the baseline value $B_{nom}$.

Processor 50 applies these factors in steps 88 and in computing DX corrections, i.e., X-direction relative shifts that are to be applied to the pixels in the IR-reference and IR-RGB stereoscopic depth computations. The corrected shift values $x_{nom}$ are given by:

$$dx_{nom} = (dx_{meas} \cdot (1+\alpha) - \beta \cdot (x_{real}^{image} - x_0) + \alpha \cdot (x_{real}^{image} - x_1)) \cdot \left(1 - \frac{B_{error}}{B_{nom}}\right)$$

Here $dx_{meas}$ represents the measured X-direction disparity (shift) value at the pixel in question, measured at the coordinate $x_{real}^{image}$, taken relative to the image center $x_0$ (for the IR camera) or the image or pattern center $x_1$ (for the illumination subassembly or the RGB camera). The factor α represents the expansion or shrinking of the illumination subassembly or the RBG camera, while β represents the expansion or shrinking of the IR camera (due to focal length changes).

The processor updates the DY correction at step 92, as explained above.

Processor 50 uses the latest corrections generated by the process of FIG. 5 in computing the pattern-based and stereo depth values for subsequent depth maps, at steps 60 and 62. The processes of FIGS. 3 and 5 proceed in parallel, such that the frames that are used in gathering statistics for the calibration process of FIG. 5 are typically processed at the same time to generate depth maps. Updated calibration parameter are passed from the process of FIG. 5 to the process of FIG. 3 as and when they are needed.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. A method for depth mapping, comprising:
projecting a pattern of infrared optical radiation onto an object;
capturing an infrared image of the pattern on the object using a first image sensor, and processing the infrared image alone to generate pattern-based depth data with respect to the object;
capturing a color image of the object using a second image sensor, at a known spacing from the first image sensor, wherein the projected pattern does not appear in the color image, and stereoscopically measuring a local offset between locations in the color image and the infrared image resulting from parallax between the first and second image sensors so as to generate stereoscopic depth data with respect to the object based on the measured offset and the known spacing; and combining the pattern-based depth data from a first area of a scene containing the object with the stereoscopic depth data from a different, second area of the scene in which the projected pattern has a contrast too low to enable reliable detection to create a depth map of the object.

2. The method according to claim 1, wherein the color image comprises pixels, and the depth map comprises depth values, and wherein the method comprises outputting the color image to a display together with the depth coordinates that are associated with the pixels.

3. The method according to claim 1, wherein projecting the pattern comprises projecting multiple spots onto the object, and wherein processing the infrared image comprises finding respective transverse shifts between the spots on the object and the spots in a reference image of the pattern, and computing the depth data based on the transverse shifts.

4. The method according to claim 1, wherein combining the pattern-based depth data with the stereoscopic depth data comprises computing respective measures of confidence associated with the pattern-based depth data and stereoscopic depth data, and selecting depth coordinates from among the pattern-based and stereoscopic depth data responsively to the respective measures of confidence.

5. The method according to claim 1, wherein combining the pattern-based depth data with the stereoscopic depth data comprises defining multiple candidate depth coordinates for each of a plurality of pixels in the depth map, and selecting one of the candidate depth coordinates at each pixel for inclusion in the depth map.

6. The method according to claim 5, wherein the multiple candidate depth coordinates comprise, for at least some of the pixels, a null coordinate indicating that no valid depth coordinate was found.

7. The method according to claim 5, wherein selecting the one of the candidate depth coordinates comprises applying weighted tensor voting among the pixels in order to select the one of the candidate depth coordinates based on the candidate depth coordinates at neighboring pixels.

8. The method according to claim 1, wherein combining the pattern-based depth data with the stereoscopic depth data comprises applying a calibration procedure to the infrared and color images so as to correct for a misalignment between the infrared and color images.

9. The method according to claim 8, wherein applying the calibration procedure comprises correcting for a change in alignment between the pattern of optical radiation and the first image sensor.

10. Apparatus for depth mapping, comprising:
an illumination subassembly, which is configured to project a pattern of infrared optical radiation onto an object;
a first image sensor, which is configured to capture an infrared image of the pattern on the object;
a second image sensor, which is located at a known spacing from the first image sensor and is configured to capture a color image of the object, wherein the projected pattern does not appear in the color image; and
a processor, which is configured to process the infrared image alone to generate pattern-based depth data with respect to the object, to stereoscopically measure a local offset between locations in the infrared image and the color image resulting from parallax between the first and second image sensors so as to generate stereoscopic depth data with respect to the object based on the measured offset and the known spacing, and to combine the pattern-based depth data from a first area of a scene containing the object with the stereoscopic depth data from a different, second area of the scene in which the projected pattern has a contrast too low to enable reliable detection to create a depth map of the object.

11. The apparatus according to claim 10, wherein the color image comprises pixels, and the depth map comprises depth values, and wherein the processor is configured to output the color image to a display together with the depth coordinates that are associated with the pixels.

12. The apparatus according to claim 10, wherein the projected pattern comprises multiple spots that are projected onto the object, and wherein the processor is configured to find respective transverse shifts between the spots on the object and the spots in a reference image of the pattern, and to compute the depth data based on the transverse shifts.

13. The apparatus according to claim 10, wherein the processor is configured to associate respective measures of confidence with the pattern-based depth data and stereoscopic depth data, and to select depth coordinates from among the pattern-based and stereoscopic depth data responsively to the respective measures of confidence.

14. The apparatus according to claim 10, wherein the processor is configured to define multiple candidate depth coordinates for each of a plurality of pixels in the depth map, and to select one of the candidate depth coordinates at each pixel for inclusion in the depth map.

15. The apparatus according to claim 14, wherein the multiple candidate depth coordinates comprise, for at least some of the pixels, a null coordinate indicating that no valid depth coordinate was found.

16. The apparatus according to claim 14, wherein the processor is configured to apply weighted tensor voting among the pixels in order to select the one of the candidate depth coordinates based on the candidate depth coordinates at neighboring pixels.

17. The apparatus according to claim 10, wherein the processor is configured to apply a calibration procedure to the infrared and color images so as to correct for a misalignment between the infrared and color images.

18. The apparatus according to claim 17, wherein the calibration procedure comprises correcting for a change in alignment between the pattern of optical radiation and the first image sensor.

19. A computer software product, comprising a non-transitory computer-readable medium in which program instructions are stored, which instructions, when read by a processor, cause the processor to receive an infrared image from a first image sensor of a pattern that has been projected onto an object and to receive a color image of the object from a second image sensor at a known spacing from the first image sensor, wherein the projected pattern does not appear in the color image, and to process the infrared image alone to generate pattern-based depth data with respect to the object, to stereoscopically measure a local offset between locations in the infrared image and the color image resulting from parallax between the first and second image sensors so as to generate stereoscopic depth data with respect to the object based on the measured offset and the known spacing, and to combine the pattern-based depth data from a first area of a scene containing the object with the stereoscopic depth data from a different, second area of the scene in which the projected pattern has a contrast too low to enable reliable detection to create a depth map of the object.

20. The method according to claim 1, wherein incorporating the stereoscopic depth data comprises using the stereoscopic depth data over at least a part of the object in which the pattern is washed out by non-patterned illumination.

21. The method according to claim 1, wherein incorporating the stereoscopic depth data comprises using the stereoscopic depth data over at least a part of the object having a low reflectance of the infrared optical radiation.

22. The method according to claim 4, wherein in the second area of the scene, the stereoscopic depth data has a greater measure of confidence than the pattern-based depth data.

* * * * *